(12) United States Patent
Chappo et al.

(10) Patent No.: US 8,735,832 B2
(45) Date of Patent: May 27, 2014

(54) DATA ACQUISITION

(75) Inventors: Marc A. Chappo, Elyria, OH (US);
Randall P. Luhta, Highland Heights, OH (US)

(73) Assignee: Koninklijke Philips N.V., Eindhoven (NL)

( * ) Notice: Subject to any disclaimer, the term of this patent is extended or adjusted under 35 U.S.C. 154(b) by 228 days.

(21) Appl. No.: 13/255,516

(22) PCT Filed: Feb. 18, 2010

(86) PCT No.: PCT/IB2010/050724
§ 371 (c)(1),
(2), (4) Date: Sep. 9, 2011

(87) PCT Pub. No.: WO2010/109354
PCT Pub. Date: Sep. 30, 2010

(65) Prior Publication Data
US 2012/0097856 A1    Apr. 26, 2012

Related U.S. Application Data

(60) Provisional application No. 61/163,499, filed on Mar. 26, 2009.

(51) Int. Cl.
*G01T 1/20* (2006.01)
(52) U.S. Cl.
USPC ........................................ 250/363.01; 378/19
(58) Field of Classification Search
USPC ........ 250/363.1, 366; 327/101; 341/155, 162; 378/19
See application file for complete search history.

(56) References Cited

U.S. PATENT DOCUMENTS

| | | | |
|---|---|---|---|
| 4,052,620 A | 10/1977 | Brunnett | |
| 4,109,168 A | * 8/1978 | Raymond | ..................... 327/101 |
| 5,012,247 A | 4/1991 | Dillman | |
| 5,363,055 A | 11/1994 | Ribner | |

(Continued)

FOREIGN PATENT DOCUMENTS

DE    102007033671 A1    1/2008

OTHER PUBLICATIONS

Title: A new 2D-tiled detector for multislice CT, Authors:Randy Luhta, Marc Chappo, Brian Harwood, Rod Mattson, Dave Salk and Chris Vrettos, Date: 2006, Publisher: Physics of Medical Imaging.*

(Continued)

*Primary Examiner* — David Porta
*Assistant Examiner* — Taeho Jo

(57) ABSTRACT

An imaging detector includes a scintillator array (202), a photosensor array (204) optically coupled to the scintillator array (202), a current-to-frequency (I/F) converter (314), and logic (312). The I/F converter (314) includes an integrator (302) and a comparator (310), and converts, during a current integration period, charge output by the photosensor array (204) into a digital signal having a frequency indicative of the charge. The logic (312) sets a gain of the integrator (302) for a next integration period based on the digital signal for the current integration period. In one instance, the gain is increased for the next integration period, relative to the gain for the current integration period, which allows for reducing an amount of bias current injected at an input of the I/F converter (314) to generate a measurable signal in the absence of radiation, which may reduce noise such as shot noise, flicker noise, and/or other noise.

22 Claims, 6 Drawing Sheets

(56) References Cited

U.S. PATENT DOCUMENTS

Figure 1:
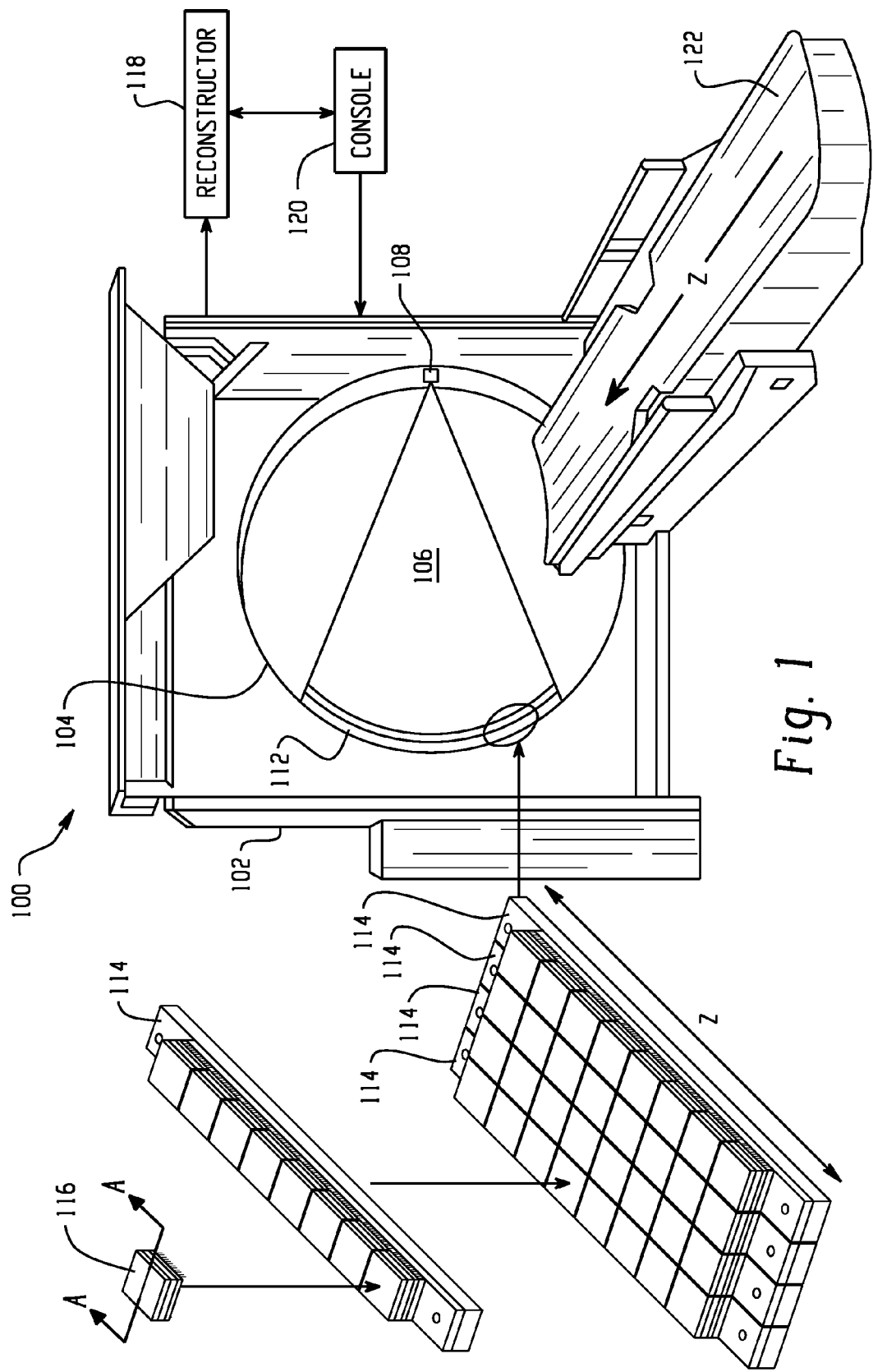

| | | | |
|---|---|---|---|
| 5,892,585 A * | 4/1999 | Lianza et al. | 356/405 |
| 6,510,195 B1 | 1/2003 | Chappo et al. | |
| 6,586,743 B1 * | 7/2003 | Overdick et al. | 250/370.11 |
| 6,671,345 B2 | 12/2003 | Vrettos et al. | |
| 7,180,366 B2 | 2/2007 | Roos et al. | |
| 7,388,534 B2 | 6/2008 | Astley et al. | |
| 2002/0141530 A1 * | 10/2002 | Vrettos et al. | 378/19 |
| 2002/0176067 A1 * | 11/2002 | Charbon | 356/4.01 |
| 2005/0121617 A1 * | 6/2005 | Heismann et al. | 250/370.11 |
| 2006/0119427 A1 * | 6/2006 | Roos et al. | 330/86 |
| 2006/0281067 A1 * | 12/2006 | Simpson et al. | 435/4 |
| 2008/0018505 A1 | 1/2008 | Astley et al. | |
| 2008/0174464 A1 * | 7/2008 | Robert | 341/155 |
| 2008/0217546 A1 * | 9/2008 | Steadman et al. | 250/370.09 |
| 2009/0121146 A1 | 5/2009 | Luhta et al. | |
| 2010/0226495 A1 * | 9/2010 | Kelly et al. | 380/30 |

OTHER PUBLICATIONS

Luhta, R., et al.; A new 2D-tiled detector for multislice CT; 2006; Physics of Medical Imaging; vol. 6142; pp. 1-12.

* cited by examiner

US 8,735,832 B2

DATA ACQUISITION

CROSS REFERENCE TO RELATED APPLICATIONS

This application claims the benefit of U.S. provisional application Ser. No. 61/163,499 filed Mar. 26, 2009, which is incorporated herein by reference.

The following generally relates to data acquisition, and finds particular application to computed tomography (CT). However, it also amenable to other medical imaging applications and to non-medical imaging applications.

A computed tomography (CT) scanner includes an x-ray tube mounted on a rotatable gantry that rotates around an examination region about a longitudinal or z-axis. A detector array subtends an angular arc opposite the examination region from the x-ray tube. The detector array detects radiation that traverses the examination region and a subject or object therein and generates a signal indicative thereof. A reconstructor reconstructs the signal and generates volumetric image data. The volumetric image data can be processed to generate one or more images.

The detector array generally includes a scintillator array optically coupled to a photosensor array, which is electrically coupled to processing electronics. The scintillator array generates light indicative of radiation impinging thereon, the photosensor array generates an electrical signal indicative of the light, and the processing electronics includes an analog-to-digital (A/D) converter that generates digital data indicative of the detected radiation based on the electrical signal. The digital data is processed to generate the signal reconstructed by the reconstructor.

Unfortunately, as detection technology continues to evolve to more slices, smaller slice widths, lower signals and faster rotation times, noise and/or spatial resolution constraints can limit imaging performance.

Aspects of the present application address the above-referenced matters and others.

According to one aspect, an imaging detector includes a scintillator array, a photosensor array optically coupled to the scintillator array, a current-to-frequency (I/F) converter, and logic. The I/F converter includes an integrator and a comparator. The I/F converter converts, during a current integration period, charge output by the photosensor array into a digital signal having a frequency indicative of the charge. The logic sets a gain of the integrator for a next integration period based on the digital signal for the current integration period.

In another embodiment, a method includes converting charge indicative of impinging radiation into a digital signal having a frequency indicative of the charge via a current-to-frequency (I/F) converter of a detector tile, and identifying a gain for the I/F converter based on an output of the I/F converter.

In another embodiment, an imaging system includes a radiation source that emits radiation that traverses an examination region and a detector array that detects radiation traversing the examination region. The detector array includes a scintillator array, a photosensor array optically coupled to the scintillator array, and a current-to-frequency (I/F) converter. The I/F converter includes an integrator and a comparator, and converts, during a current integration period, input charge from the photosensor array into a digital signal having a frequency indicative of the charge. Logic sets a gain of the integrator for a next integration period based on the digital signal for the current integration period.

The invention may take form in various components and arrangements of components, and in various steps and arrangements of steps. The drawings are only for purposes of illustrating the preferred embodiments and are not to be construed as limiting the invention.

Figure 2:
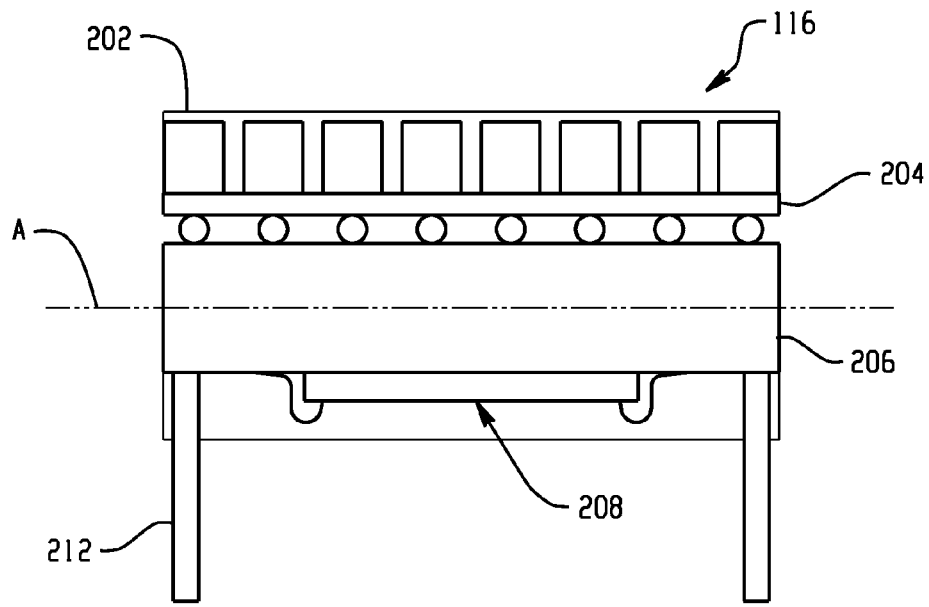
Figure 3:
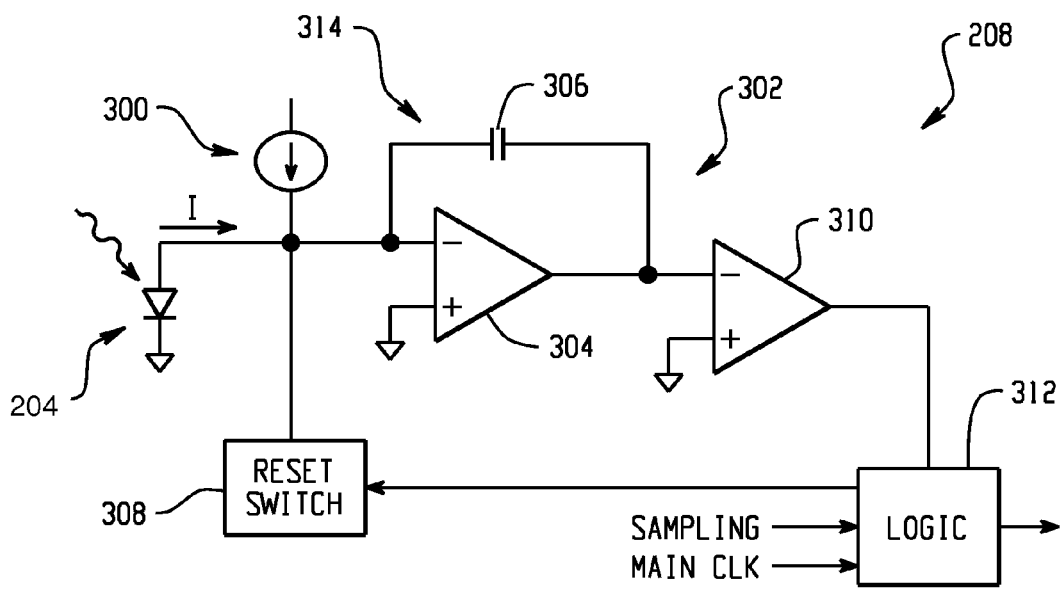
Figure 4:
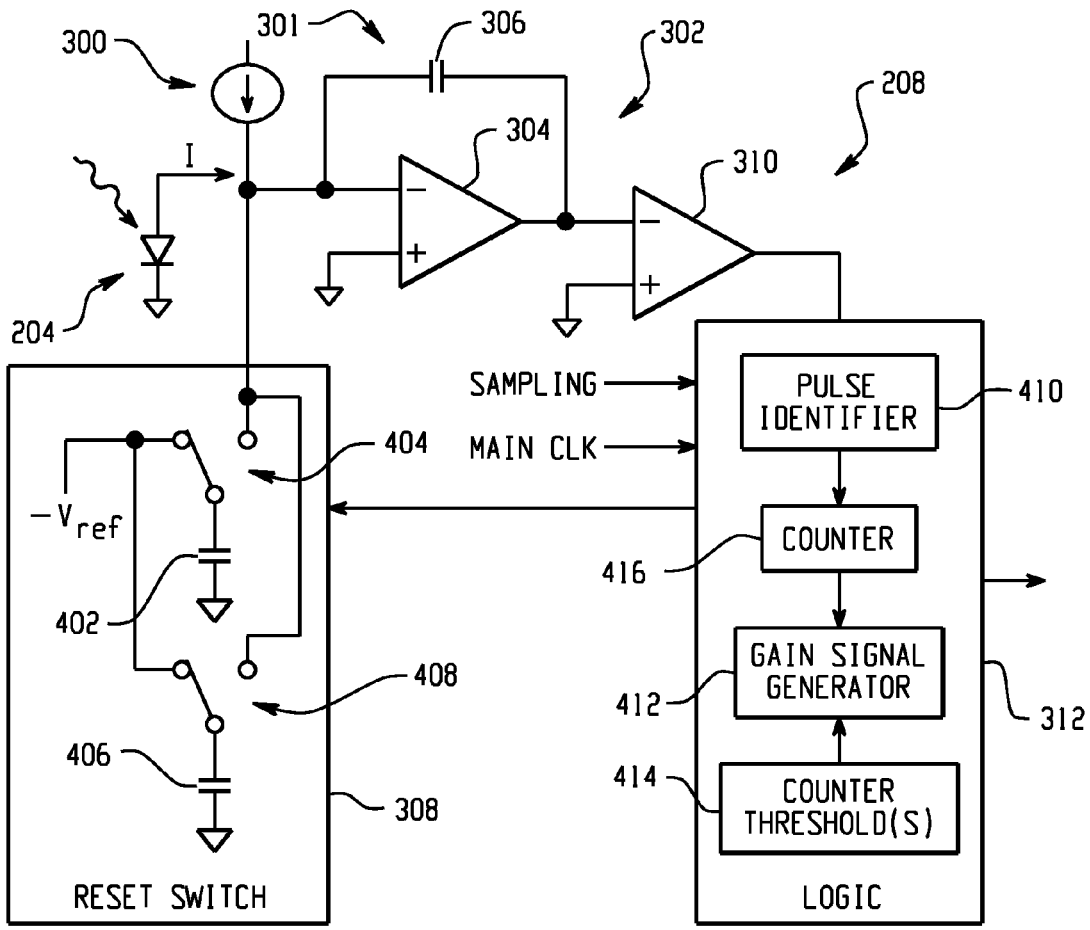
Figure 5:
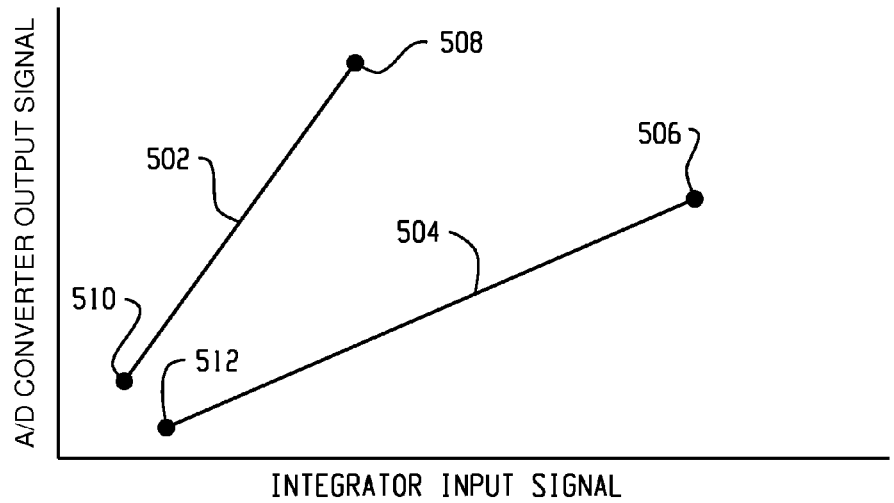
Figure 6:
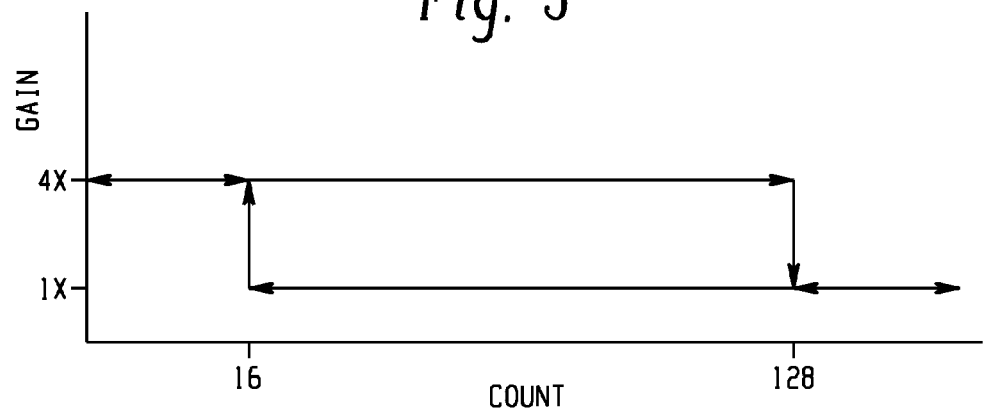
Figure 7:
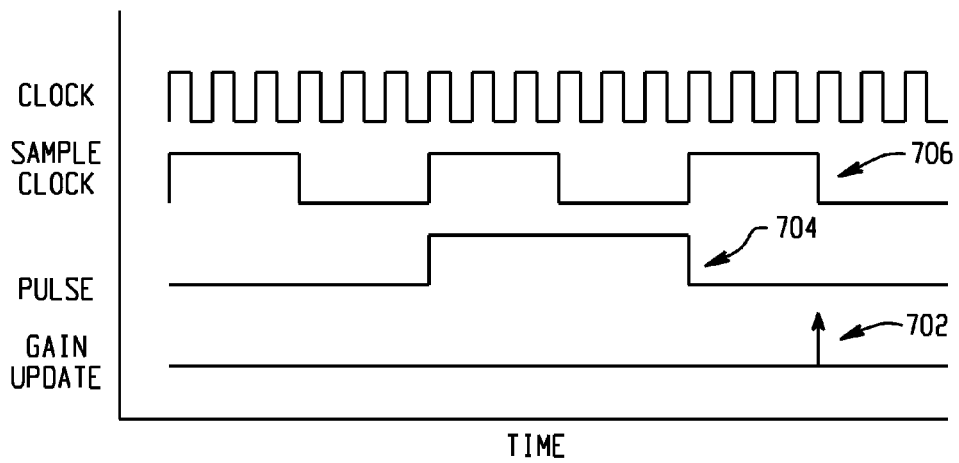
Figure 8:
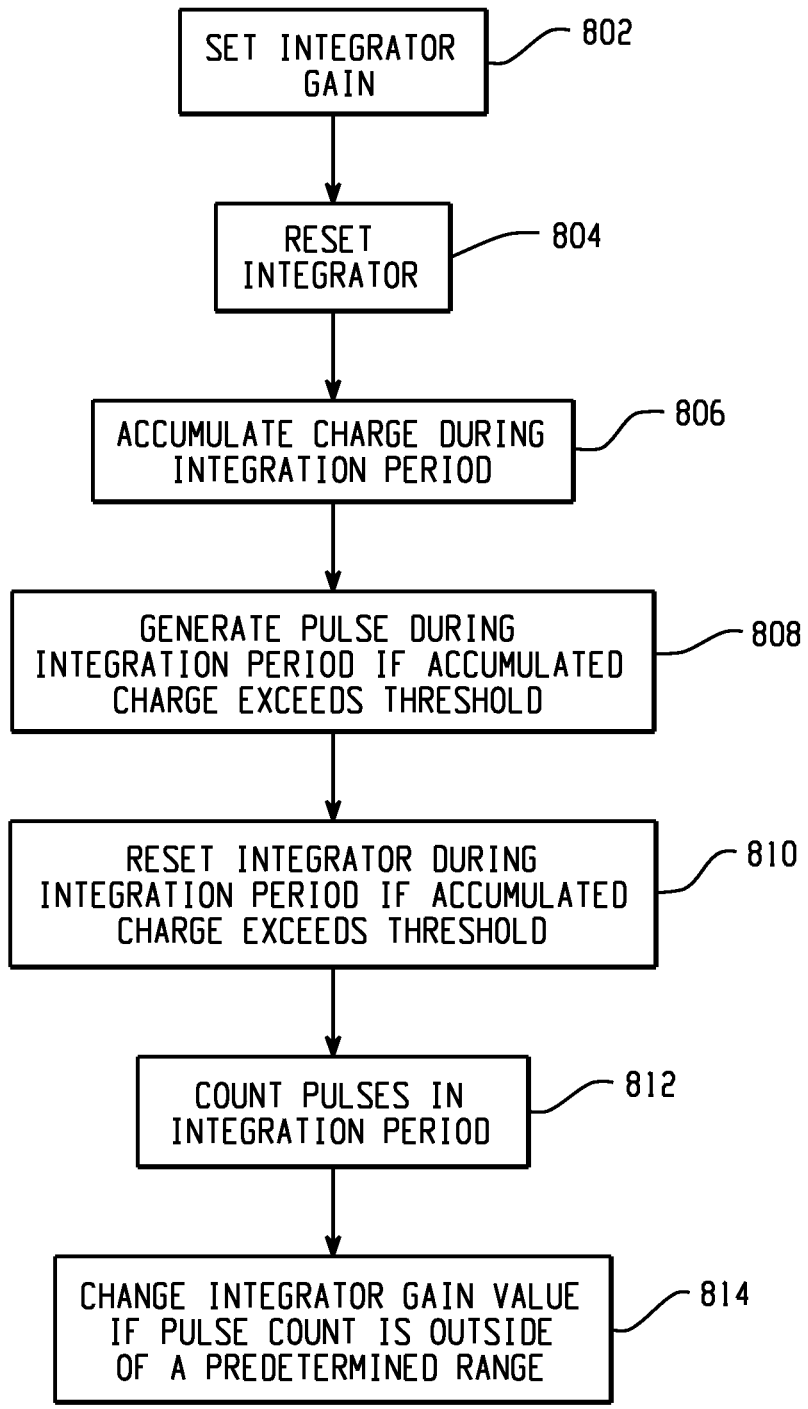
Figure 9:
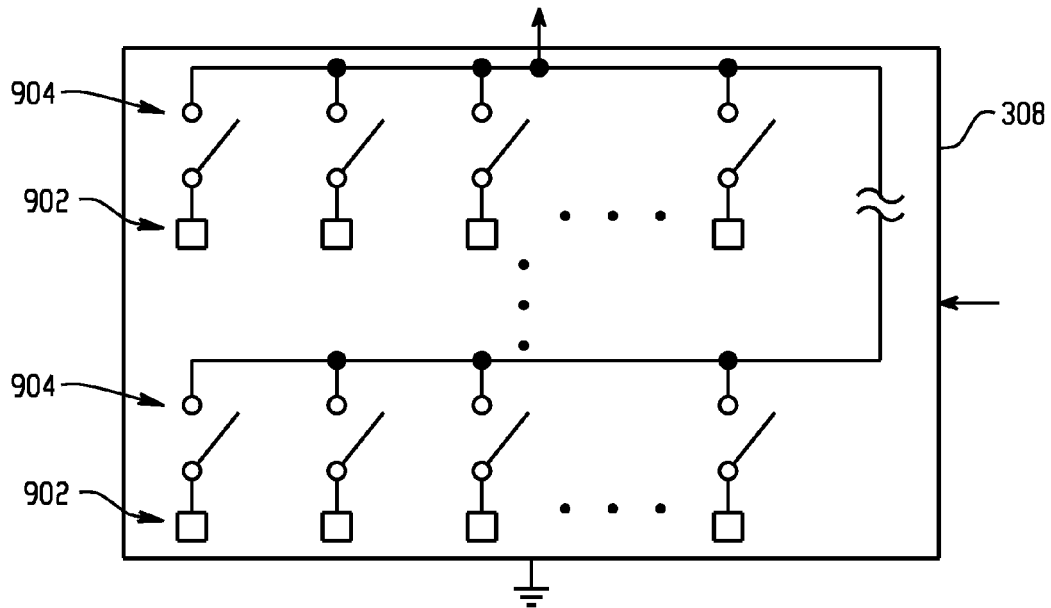
Figure 10:
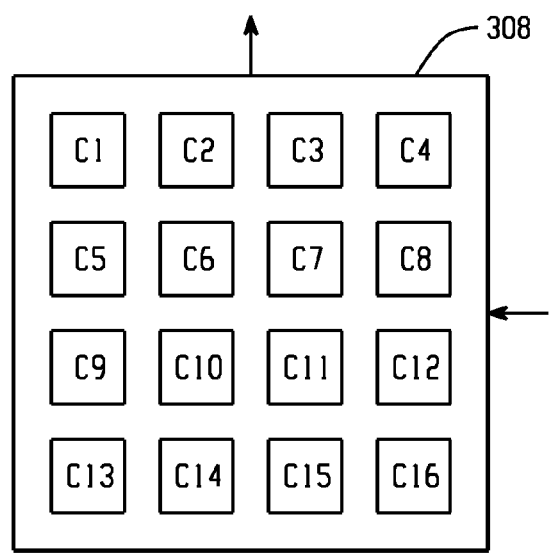

FIG. 1 illustrates an example imaging system.
FIG. 2 illustrates an example detector tile.
FIG. 3 illustrates example detector electronics.
FIG. 4 illustrates example detector electronics.
FIG. 5 illustrates example gain curves.
FIG. 6 illustrates an example gain stepping diagram.
FIG. 7 illustrates an example gain switching timing diagram.
FIG. 8 illustrates an example method.
FIG. 9 illustrates an integrator reset switch with multiple capacitors.
FIG. 10 illustrates an integrator reset switch with sixteen capacitors.

FIG. 1 illustrates an imaging system 100 such as a computed tomography (CT) scanner. The imaging system 100 includes a generally stationary gantry 102 and a rotating gantry 104. The rotating gantry 104 is rotatably supported by the stationary gantry 102 and rotates around an examination region 106 about a longitudinal or z-axis. A radiation source 108 such as an x-ray tube is supported by the rotating gantry 104 and emits radiation that traverses the examination region 106.

A radiation sensitive detector array 112 subtends an angular arc opposite the radiation sources 108 across the examination region 106 and detects radiation traversing the examination region 106. In the illustrated embodiment, the radiation sensitive detector array 112 includes a plurality of detector modules 114 arranged with respect to each other along a direction transverse to the z-axis. A detector module 114 includes a plurality of detector mosaics or tiles 116 arranged with respect to each other along the z-axis. In one instance, the detector array 112 is substantially similar to and/or based on the detector array described in U.S. Pat. No. 6,510,195B1, filed Jul. 18, 2001, and entitled "Solid State X-Radiation Detector Modules and Mosaics thereof, and an Imaging Method and Apparatus Employing the Same," which is incorporated herein by reference in its entirety. Other detector array arrangements are also contemplated herein.

Turning to FIG. 2, a cross-sectional view of a detector tile 116 along line A-A of FIG. 1 is illustrated. The illustrated tile 116 includes a scintillator array 202 physically and optically coupled to a photosensor array 204, which is electrically coupled to electronics 208 through a substrate 206. Electrical pathways 212 such as connector pins or other electrical pathways carry power supplies and digital I/O signals. An example of such a tile is described in "A New 2D-Tiled Detector for Multislice CT," Luhta et al., Medical Imaging 2006: Physics of Medical Imaging, Vol. 6142, pp. 275-286 (2006). Another suitable tile is described in patent application Ser. No. 60/743,976, filed on Mar. 30, 2006, and entitled "Radiation Detector Array," which is incorporated in its entirety by reference herein. Other electronics are also contemplated.

FIG. 3 illustrates example electronics 208. An analog-to-digital (A/D) converter 314 includes an integrator 302 (an amplifier 304 and an integrating capacitor 306) and a comparator 310. The integrator 302 integrates charge output by the photosensor array 204 and a bias current 300, if employed, during an integration period. The comparator 310 compares the output of the amplifier 304 with a threshold value and generates a signal indicative thereof such a pulse when the output rises above the threshold value. A reset switch 308 resets the integrator 302 during the integration period in response to the generation of a pulse.

In the above configuration, the A/D converter 314 is employed as a current-to-frequency (I/F) converter in that it generates a pulse train with a pulse frequency indicative of the input charge. An example of such electronics is further described in U.S. Pat. No. 6,671,345B2, filed Nov. 7, 2001, and entitled "Data Acquisition for Computed Tomography," which is incorporated herein by reference in its entirety. Other suitable electronics are described in U.S. Pat. No. 4,052,620, filed Nov. 28, 1975, and entitled "Data Acquisition for Computed Tomography," both of which are incorporated herein by reference in its entirety. Other converters are also contemplated herein.

Digital logic 312 controls the reset switch 308, including closing the reset switch 308 to reset the integrator 302 in response to detecting a pulse in the comparator output, on an integration period boundary, and/or otherwise. As described in greater detail below, the reset switch 308 can be configured to include two or more reset capacitances corresponding to two or more integrator gains, and the digital logic 312 can be configured to determine a gain for the integrator 302, which can be used to select a suitable reset capacitance from the two or more reset capacitances. This allows for dynamically selecting a higher gain for smaller charge signals and a lower gain for larger charge signals, or dynamically switching the dynamic range for measuring smaller and larger charge signals.

Since an analog bias current is required to generate a minimum signal for digitization in the absence of real detector signals, it is to be appreciated that increasing the gain allows for reducing the amount of bias current 300, for example, by the gain factor or to zero, and reducing the bias current 300 may reduce shot noise (e.g., by the square root of the bias current reduction) and/or flicker noise reduction proportional to bias current reduction. Linearity errors generally scale with signal level and gain, and the gain value can be employed with linearity corrections, if one is employed. Low signal levels generally have suitable linearity and thus such corrections may be limited or omitted. In configurations in which the electronics 208 include log conversion, the gain factor can be an input to the log converter and transparent to the reconstruction subsystem that utilizes the log data.

The digital logic 312 also processes the output of the comparator 310. In one instance, this includes counting a number of pulses from the comparator 310 and determining a time from a first pulse of the integration period to a last pulse of the integration period. From this data, the digital logic unit 312 can generate an output signal indicative of the frequency of the pulses (e.g., number of pulses in an integration period/the time between the first and last pulses in the integration period), which is indicative of the input charge.

Returning to FIG. 1, a reconstructor 118 reconstructs the signal from the detector array 112 and generates volumetric image data indicative thereof. An image processor or the like can generate one or more images based on the image data. A general purpose computing system serves as an operator console 120. Software resident on the console 120 allows the operator to control the operation of the system 100. A patient support 122, such as a couch, supports an object or subject such as a human patient in the examination region 106.

FIG. 4 illustrates an example embodiment of the reset switch 308 and the logic 312. The illustrated reset switch 308 includes a first capacitor 402, with a first capacitance corresponding to a first integrator gain, coupled to a first switch 404, and a second capacitor 406, with a second capacitance corresponding to a second integrator gain, coupled to a second switch 408. Although two switch/capacitor pairs are shown in the illustrated embodiment, in other embodiments more than two switch/capacitor pairs can be employed. In such embodiments, two or more, including all, of the pairs may correspond to different integrator gains.

Each of the switches 404 and 408 independently switches between a first state in which the corresponding capacitor 402 or 406 is in electrical communication with a reference voltage, and a second state in which the corresponding capacitor 402 or 406 is in electrical communication with the input of the integrator 302. The switches 404 and 408 can concurrently be in the first state, but only one of the switches 404 or 408 is in the second state at any given time. When in the second state, the respective capacitor is used to reset the integrator 302.

The logic 312 includes a pulse identifier 410 that identifies a pulse in the comparator output signal and generates a reset signal in response thereto. The reset signal includes information that invokes switching a selected one of the switches 404 and 408. For instance, the signal my include information that results in switching the switch 404 (or the switch 408), during an integration period, that corresponds to the gain for that integration period to reset the integrator 302 during that integration period.

The logic 312 also includes a gain signal generator 412 that generates a gain signal based on a pulse count for an integration period and one or more thresholds 414. A counter 416 counts identified pulses during an integration period and generates the pulse count value. The gain signal includes information indicative of a gain value or a gain factor (e.g., representing a change in a gain), which indicates which of the switches 404 or 408 is to be reset during a subsequent integration period. The information can be represented through binary or non-binary data.

The above allows for dynamically controlling the gain for a subsequent integration period based on the charge signal level of a current integration period. As such, when the input charge signal and thus the pulse count is relatively high for an integration period, a lower gain/higher capacitance capacitor is selected for the next integration period. Using a lower gain capacitor extends the upper end of the dynamic range of the amplifier to accept larger signals before being saturated, relative to using a higher gain capacitor.

When the input charge signal and thus the pulse count is relatively low for an integration period, a higher gain/lower capacitance capacitor is selected for the next integration period. Using a lower value capacitor extends the lower end of the dynamic range for measuring smaller signals, relative to using a higher value capacitor. As discussed herein, extending the lower end of the dynamic range allows for reducing the amount of bias current injected into the integrator 302.

In the above example, the switches 404 and 408 are independently switched, and the integrator 302 is reset by electrically connecting either the first capacitor 402, which corresponds to the first gain, or the second capacitor 406, which corresponds to the second gain, to the input of the integrator 302. In another embodiment, the switches 404 and 408 can also be concurrently switched. In such an embodiment, a lower reset gain can be set by concurrently closing both switches 404 and 408, where the reset capacitance is a summation of the first and second capacitances. A higher reset gain can be set as described above by closing the switch 404 (or alternatively the switch 408) and electrically connecting the first capacitor 402 (or the second capacitor 406) to the input of the integrator 302.

Sharing a capacitor as such allows for reducing the footprint of the reset switch 308 as the second capacitor 406 (or the first capacitor 402) can be smaller relative to an embodiment in which a capacitor is not shared. Further, in layout of integrated circuits, capacitors of a given size can be made of smaller capacitors connected by controllable parasitic-free switches, where one large capacitance value can be made of a plurality (e.g., sixteen (16)) of equal or non-equal size smaller capacitors connected via the switches. This allows the gain of the circuit (reset capacitance value) to be selected in digital binary manner or fashion (e.g., from one (1) to (16)) and the values of the capacitors to be accurately reproduced via their layout position to account for process variations, which can result in accurate linearity for gain switching, thereby allowing for making a substantially linear gain change implementation.

One non-limiting implementation of the above is shown in block diagram form in FIG. 9, in which the reset switch 308 includes a plurality of capacitors 902 that can be electrically connected in parallel via switches 904, and a particular capacitance value can be set by selectively closing one or more of the switches 904. Another non-limiting implementation is shown in block diagram form in FIG. 10, in which the reset switch 308 includes sixteen (16) capacitors C1, ..., C16 which can be selectively electrically connected in parallel to provide particular reset capacitance values, such as four (4), sixteen (16) or other number of reset capacitance values. The same parasitic free switches shown in FIG. 9 may be used in connection with FIG. 10.

Table 1 shows non-limiting combinations of the capacitors C1, ..., C16 that can be used to provide four (4) reset capacitance values RS1, ..., RS4 such that binary combinations of capacitances can be selected to generate values of capacitance in increments of $1/16^{th}$ of the total value, and Table 2 show non-limiting combinations of the capacitors C1, ..., C16 that can be used to provide sixteen (16) reset capacitance values RS1, ..., RS16.

TABLE 1

Four reset capacitance values.

| Reset capacitance (RS) | Capacitors |
| --- | --- |
| RS1 | C11 |
| RS2 | C6, C11 |
| RS3 | C6, C7, C10, C11 |
| RS4 | C1, C2, C3, C4, C5, C8, C9, C12, C13, C16 |

TABLE 2

Sixteen reset capacitance values.

| Reset capacitance (RS) | Capacitors |
| --- | --- |
| RS1 | C11 |
| RS2 | C6, C11 |
| RS3 | C6-C7, C11 |
| RS4 | C6-C7, C10-C11 |
| RS5 | C6-C7, C10-C11, C16 |
| RS6 | C1, C6-C7, C10-C11, C16 |
| RS7 | C1, C4, C6-C7, C10-C11, C16 |
| RS8 | C1, C4, C6-C7, C10-C11, C13, C16 |
| RS9 | C1, C4, C6-C8, C10-C11, C13, C16 |
| RS10 | C1, C4, C6-C11, C13, C16 |
| RS11 | C1, C3-C4, C6-C11, C13, C16 |
| RS12 | C1, C3-C4, C6-C11, C13-C14, C16 |
| RS13 | C1, C3-C4, C6-C14, C16 |
| RS14 | C1, C3-C14, C16 |
| RS15 | C1, C3-C16 |
| RS16 | C1-C16 |

An example illustration of the lower and upper ends of the dynamic range for two different gains is shown in FIG. 5, in which the y-axis represents the A/D converter output signal and the x-axis represents the current at the input of the integrator 302. Two gain curves, a lower gain curve 504 and a higher gain curve 502, are shown in FIG. 5. The lower gain curve 504 has a higher charge level saturation point 506 relative to a saturation point 508 for the higher gain curve 502, but the higher gain curve 502 has a lower noise floor 510 relative to the noise floor 512 of the lower gain curve 504. As such, the lower gain curve 504 is well suited for higher charge levels, and the higher gain curve 502 is well suited for lower charge signals. Although linear gain curves are illustrated, non-linear gain curves are also contemplated herein.

FIG. 6 includes an example of suitable gain stepping diagram. The y-axis represents the gain for an integration period and the x-axis represents the count value for the integration period. In the illustrated embodiment, the gain is switched between 1x and 4x. The illustrated gain steps and gain switching locations are provided for explanatory purposes and do not limit the invention. In other embodiments, other gain value (e.g., 1, 2, 4, 16, 32, etc., or non-binary steps) can be used and/or more than two gain values can be used (e.g., 4, 8, 16, ..., 512, etc., or non-binary values).

In the illustrated embodiment, assuming the gain is at 1x, the gain remains at 1x as long as the pulse count for a subsequent integration period is 16 or higher. If the pulse count for an integration period drops below 16, then the gain for the next integration period is switched to 4x, via selecting the lower capacitance capacitor as described above. The gain of 4x remains at 4x as long as the pulse count for a subsequent integration period is less than 128. If the pulse count for a subsequent integration period rises above 128, the gain for the next integration period is switched to 1x, via selecting the higher capacitance capacitor as described above.

FIG. 7 includes an example gain switching timing diagram. In the illustrated diagram, the gain is switched at 702 after the reset pulse 704 and during a positive half 706 of the sample clock. In one instance, this may ensure that there is enough time to charge the integrator reset capacitor so that the reset charge will be correct. In other embodiment, the gain is otherwise switched.

FIG. 8 illustrates a method.

At 802, set integrator gain.

At 804, reset the integrator 302 for an integration period.

At 806, accumulate charge during the integration period.

At 808, generate a pulse during the integration period if the accumulated charge exceeds a predetermined charge threshold.

At 810, reset the integrator 302 during the integration period if the accumulated charge exceeds a predetermined charge threshold.

At 812, count the pulses for the integration period.

At 814, change the gain value of the integrator 302 if the pulse count falls outside of a predetermined range. As described herein, this may include increasing the gain if the pulse counts falls below a first pulse count threshold and decreasing the gain if the pulse count rises above a second pulse count threshold.

Acts 804 to 814 are repeated for one or more integration periods.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. An imaging detector, comprising:
   a scintillator array;

a photosensor array optically coupled to the scintillator array;

a current-to-frequency (I/F) converter, having an integrator and a comparator, that converts, during a current integration period, charge output by the photosensor array into a digital signal having a frequency indicative of the charge;

logic that sets a gain of the integrator for a next integration period based on the digital signal for the current integration period; and a reset switch that resets the integrator based on the gain set by the logic, wherein the reset switch includes at least a first reset capacitor with a first capacitance and a second reset capacitor with a second different capacitance.

2. The detector of claim 1, wherein the integrator accumulates the charge, the comparator generates a pulse when the accumulated charge exceeds a predetermined threshold, and the logic resets the integrator when a pulse is generated and sets the gain based on the pulse count for the current integration period.

3. The detector of claim 2, wherein the logic increases the gain in response to the pulse count falling below a first count threshold.

4. The detector of claim 3, wherein increasing the gain reduces the noise floor of the I/F converter, thereby allowing a relatively smaller charge to be measured by the I/F converter.

5. The detector of claim 2, wherein the logic decreases the gain in response to the pulse count rising above a second count threshold.

6. The detector of claim 5, wherein decreasing the gain increases the saturation level of the I/F converter, thereby allowing a relatively higher charge to be measured before saturation by the I/F converter.

7. The detector of claim 1, wherein the first and second capacitances correspond to first and second reset gains, and the first and second capacitors are selectively alternatively employed to reset the integrator.

8. The detector of claim 1, wherein the first or second capacitance correspond to first reset gain and a summation of the first and second capacitances corresponds to a second reset gain, and, alternatively, the first or second capacitor is employed to reset the integrator and the first and the second capacitors are concurrently employed to reset the integrator.

9. The detector of claim 1, wherein the logic comprises:
    a counter that counts pulses in an output of the comparator one or more count thresholds; and
    a gain signal generator that generates a gain signal indicative of the gain based on the count and the one or more count thresholds.

10. The detector of claim 9, wherein the logic further comprises:
    a pulse identifier that identifies pulses in the output of the comparator, wherein the counter counts the identified pulses and the gain signal generator generates the gain signal based on the count of the identified pulses.

11. The detector of claim 9, wherein the logic resets the reset switch during the current integration period in response to the pulse identifier identifying a pulse in the output of the comparator.

12. A method, comprising:
    converting charge indicative of impinging radiation into a digital signal having a frequency indicative of the charge via a current-to-frequency (I/F) converter of a detector tile;
    identifying a gain for the I/F converter based on an output of the I/F converter; and
    switching the gain between at least to different gain values for at least two different integration periods, wherein switching the gain includes switching a reset capacitance of the integrator between first and second capacitances.

13. The method of claim 12, wherein identifying the gain for the I/F converter includes identifying a gain for a next integration period based on the output of the I/F converter for a current integration period.

14. The method of claim 12, further comprising:
    counting pulses in the digital signal; and
    increasing the gain in response to the pulse count falling below a first predetermined threshold.

15. The method of claim 14, further comprising: decreasing the gain in response to the pulse count rising above a second predetermined threshold.

16. The method of claim 15, wherein the first and second predetermined threshold are different.

17. The detector of claim 12, wherein switching the reset capacitance includes switching between first and second reset capacitors respectively having different capacitances.

18. The detector of claim 12, wherein switching the reset capacitance includes switching between a first set of reset capacitors and a second set of reset capacitors, wherein the second set of reset capacitors includes the first set of reset capacitors electrically in parallel with at least one additional reset capacitor.

19. The detector of claim 12, wherein switching the gain includes selectively electrically connecting one or more of a plurality of capacitors of an integrator reset switch in parallel in a digital binary manner, via switches, based on a predetermined reset capacitance for an integrator.

20. The method of claim 12, further comprising increasing the gain for relatively small charge signals.

21. The method of claim 12, further comprising decreasing the gain for relatively large charge signals.

22. An imaging system, comprising:
    a radiation source that emits radiation that traverses an examination region;
    a detector array that detects radiation traversing the examination region, the detector array, including: a scintillator array; a photosensor array optically coupled to the scintillator array; a current-to-frequency (I/F) converter, having an integrator and a comparator, that converts, during a current integration period, input charge from the photosensor array into a digital signal having a frequency indicative of the charge; and logic that switches a gain of the integrator between at least two different gains for different integration periods based on the digital signal for the current integration period by switching a reset capacitance of the integrator between first and second capacitances.

* * * * *